United States Patent [19]

Gavin

[11] 3,974,098

[45] Aug. 10, 1976

[54] CATALYSTS OF NICKEL AND URANIUM

[75] Inventor: Derek Gabriel Gavin, Sheffield, England

[73] Assignees: Price-Pearson Refractories Limited; British Gas Corporation, both of Sheffield, England

[22] Filed: Feb. 20, 1974

[21] Appl. No.: 444,002

[30] Foreign Application Priority Data
Feb. 27, 1973 United Kingdom.............. 9755/73

[52] U.S. Cl.............................. 252/443; 208/134; 208/136
[51] Int. Cl.$^2$......................................... B01J 27/20
[58] Field of Search.................... 252/443, 465, 470

[56] References Cited
UNITED STATES PATENTS

| | | | |
|---|---|---|---|
| 3,630,967 | 12/1971 | Nicklin et al. | 252/470 X |
| 3,639,648 | 2/1972 | Nicklin et al. | 252/465 |
| 3,847,836 | 11/1974 | Nicklin et al. | 252/465 |

FOREIGN PATENTS OR APPLICATIONS

| | | | |
|---|---|---|---|
| 1,039,206 | 8/1966 | United Kingdom | 252/465 |

*Primary Examiner*—Patrick P. Garvin
*Attorney, Agent, or Firm*—Lowe, King, Price & Markva

[57] ABSTRACT

A method of producing a catalyst comprising impregnating shaped carriers of refractory material (e.g., alumina) with a solution of the salts of an active metal constituent (e.g., nickel) and an acidic or amphoteric constituent (e.g., uranium), the shaped carriers being fired to decompose the salts to form the oxide of the metal constituent and a compound or solid solution of the oxides of an active metal and acidic or amphoteric constituents, the active components of the catalyst being formed by reduction of the said oxides and/or compound or solid solution in a reducing atmosphere to form the active metal and the acidic or amphoteric constituent in a reduced or unreduced state, the shaped carriers then being impregnated with a water soluble compound of alkali or alkaline earth metal (e.g. barium hydroxide) and finally fixed as the carbonate by heating in an atmosphere containing $CO_2$.

13 Claims, No Drawings

CATALYSTS OF NICKEL AND URANIUM

This invention relates to catalysts particularly for use in the steam reforming of hydrocarbons, and to a method of producing such catalysts.

Catalysts generally of the type in question and systems in which such catalysts are employed have been extensively described in documents such as British Patent Specification Nos. 1,039,206; 1,256,697 and 1,258,413. Thus, it is known hitherto to prepare a catalyst by impregnating shaped refractory carriers, e.g., of alumina or spinel, with a solution of the nitrates of an active metal constituent (e.g. nickel) and an acidic or amphoteric constituent (e.g. uranium). The impregnated refractory supports are fired in a furnace to decompose the nitrates in order to form nickel oxide and tri-uranium octa-oxide. The process is repeated until the required quantity of nickel oxide and tri-uranium octa-oxide is present in the catalyst composition. Alkali or alkaline earth metals in the form of oxides or carbonates are added by subsequent impregnation of the nickel/urania catalyst with a soluble salt of the alkali or alkaline earth, followed by calcination.

All the uranium oxide is reacted with the nickel oxide, there being normally excess of the latter, to form a uranate of nickel with a probable formula, $NiO.3UO_3$. When reduced to give the final catalyst for use in reforming reactions, the active components are a combination of nickel from the excess nickel oxide, nickel from the nickel uranate and tetra-uranium nonoxide ($U_4O_9$).

Disadvantages associated with the catalyst are concerned firstly with the activity of the catalyst and secondly with the ability of the catalyst to prevent carbonaceous deposits during the reforming processes. It has been indicated from experience that a decrease in the quantity of nickel uranate when the catalyst is in the oxidised form, results in a decrease in activity when used for reforming. Table 1 shows examples of nickel-/uranium oxide/alumina catalysts containing barium and/or potassium together with the percentage nickel uranate and the activities given by such catalysts. The activities were determined using a bench scale activity apparatus in which the feedstock was naphtha (end boiling point 115°C) at approximately 0.36 atmospheres above atmospheric pressure. The volume of catalyst was 5 c.cs −10 + 22 BSS with an outlet temperature of 650°C and a space velocity of the naphtha of 5 vol/vol. hr. The steam (moles) to carbon (gram atom) ratio was kept constant at 5 : 1. The activities were stated as the ratio of hydrocarbon condensed after reaction to the quantity of naphtha passed over the catalyst calculated as a percentage, the condensed hydrocarbon being essentially unconverted naphtha.

TABLE 1

| % Ni | % U. | % Ba | % K | % $NiO.3UO_3$ | Activity % |
|---|---|---|---|---|---|
| 11.0 | 7.0 | — | — | 9.1 | 100.0 |
| 11.7 | 7.6 | 1.50 | — | 4.6 | 100.0 |
| 11.7 | 7.7 | 1.60 | — | 5.2 | 99.0 |
| 11.3 | 7.4 | 2.11 | — | 5.0 | 98.5 |
| 10.9 | 6.7 | 2.12 | — | 3.6 | 95.6 |
| 10.6 | 7.2 | — | 0.59 | 3.6 | 93.0 |
| 12.0 | 7.9 | 1.72 | 0.50 | 2.0 | 90.0 |

A decrease in the nickel uranate content can arise from the reaction of this compound with the alkali or alkaline earth compound to form nickel oxide and uranates of the alkali or alkaline earth. From a stoichiometric consideration of a typical catalyst, e.g., the first example in Table 1 where the catalyst composition consists of nickel oxide (14%) and uranium oxide (8.4%) the latter being combined with nickel oxide to give 13.3% nickel oxide and 9.1% nickel uranate, the addition of 2.0% barium as the oxide or carbonate could react completely with the nickel uranate to form a barium uranate $Ba U_2O_7$ and NiO. Furthermore, 1.1% potassium (calculated as the metal) present as the oxide or carbonate could react with the available nickel uranate.

To exemplify the effect of the presence of alkali or alkaline earth metal on the nickel uranate content of the catalyst six Examples are shown in Table 2 below having from zero alkali or alkaline earth to 3.14% by weight calculated as the metal barium.

TABLE 2

| Ni% | U% | Ba% | NiO 3$UO_3$ %. |
|---|---|---|---|
| 10.0 | 6.1 | 0 | 7.9 |
| 9.5 | 6.2 | 0.73 | 5.6 |
| 10.2 | 6.1 | 1.60 | 5.1 |
| 10.6 | 6.3 | 2.41 | 4.0 |
| 10.2 | 6.1 | 2.79 | 2.1 |
| 9.7 | 5.9 | 3.14 | 2.7 |

Although the reactions have not proceeded to completion it will be seen from Table 2 that increasing quantities of alkali or alkaline earth metal results in a decrease in the nickel uranate content. Thus, a limitation is introduced into the system in respect of the quantity of alkali or alkaline earth compounds that can be introduced and at the same time allow a sufficient quantity of nickel uranate to remain. But in order to enhance the ability of the catalyst to prevent carbonaceous deposits caused by the formation of polymeric species particularly when using higher molecular weight hydrocarbons, it would appear to be necessary to use greater quantities of alkali or alkaline earth compounds which in turn would affect the activity of the catalyst by the said reaction.

The object of the present invention is to provide a method of producing a catalyst by which method the full benefit of one of the active components of the catalyst e.g., nickel from nickel uranate is obtained and at the same time allows the concentration of alkali or alkaline earth compounds to be increased, whereby a catalyst having high activity and having good resistance to the deposition of carbon is provided.

According to the present invention, shaped carriers of refractory material are impregnated with a solution of the salts of an active metal constituent and an acidic or amphoteric constituent, the shaped carriers being fired when the salts decompose to form the oxide of the metal constituent and a compound or solid solution of the oxides of the active metal and acidic or amphoteric constituents, the active components of the catalyst being formed by reduction of the said oxides and/or compound or solid solution in a reducing atmosphere to form the active metal and the acidic or amphoteric constituent in a reduced or unreduced state, the shaped carriers then being impregnated with a water soluble compound of alkali or alkaline earth metal and finally fixed as the carbonate by heating in an atmosphere containing $CO_2$.

Preferably, the refractory material of the carrier is alumina, and it is further preferred that the active metal constituent is nickel and the acidic or amphoteric constituent is an oxide of uranium.

Thus, according to a preferred feature of the invention, a shaped carrier of alumina is impregnated with a solution of nitrates of nickel and uranium, and the impregnated carrier fired in air to form the oxide of nickel and nickel uranate, the active components of the catalyst being formed by reduction of the nickel oxide and nickel uranate in a reducing atmosphere to form nickel metal and tetra-uranium nonoxide, following which the carrier is impregnated with a water soluble compound of alkali or alkaline earth metal and fixed as the carbonate by heating in an atmosphere containing $CO_2$. Preferably, the carrier is fired in air to form the said oxides at a temperature in the range 350° to 900°C, more preferably 500° to 650°C. The reduction of nickel oxide and nickel uranate is preferably effected in the temperature range 350° to 900°C, more preferably 450° to 550°C. The final heating to fix the alkali or alkaline earth metal as the carbonate is at a temperature within the range ambient to 600°C or more preferably in the range 120° to 200°C. The water soluble compound of alkali or alkaline earth metal is preferably barium hydroxide. When using barium hydroxide, care should be taken that the barium hydroxide should be substantially free from sulphur, as sulphur has a poisoning effect on the catalyst which has a substantial effect on the activity.

In terms of composition of the catalyst it is preferred that there is 2 to 60% by weight nickel (expressed as the metal) 5 to 15% by weight uranium (expressed as the metal) and up to 43% by weight alkali or alkaline earth metal (expressed as the metal). It is further preferred that the alkali or alkaline earth metal is in the range 1.7 to 12% by weight.

Several typical examples of catalyst produced in accordance with the invention will now be described. The catalysts of Examples 1 to 4 were prepared following the method described in British Patent Specification No. 1,039,206 followed by a reducing step in accordance with the invention. Thus, preformed corundum supports in the form of Raschig rings with a water absorption capacity of 21% were impregnated with a mixed solution of nickel and uranyl nitrates and fired at a temperature of 600°C for 1 hour. The cycle was repeated four times to produce a catalyst containing 11% nickel and 7% uranium expressed as the metals. The nickel was present partly as nickel oxide and partly as nickel uranate, $NiO.3UO_3$ and the uranium was combined wholly as nickel uranate. The rings impregnated with nickel oxide and nickel uranate were treated with hydrogen gas at 500°C until all the nickel oxide had been reduced to nickel metal and the nickel uranate to nickel metal and $U_4O_9$ after which process the catalyst was impregnated with $Ba(OH)_2$. Because of the nature of the equipment for testing the catalyst, it was necessary to crush to BSS −10 + 20 the impregnated support after completion of the process of the invention.

All of Examples 1 to 4 were low pressure tests and intended to show the activity of the catalysts. Thus, the activity tests employed in Examples 1 to 4 were conducted in a bench scale rig at a pressure of 0.36 atmospheres above atmospheric pressure and a liquid hourly space velocity (L.H.S.V.) of 5 vol/vol h as previously described. In all of Examples 1 to 8, the steam to carbon ratio is expressed as moles to gram atoms. In Examples 1 to 4 the catalyst was found to have 9.5% nickel uranate and Examples 5 to 7 8.2% nickel uranate.

EXAMPLE 1

500g. of the reduced nickel/urania catalyst was suspended in 500 ml. of a solution of barium hydroxide containing 233g. of barium per liter at 95°C for 10 minutes. The impregnated catalyst was heated in an atmosphere of $CO_2$ at 160°C until no more steam was evolved and all the $Ba(OH)_2$ had been converted to $BaCO_3$. The catalyst contained 3.64% barium. Normal hexane ($n-C_6H_{14}$) and steam were passed over the catalyst as described above at 0.36 atmospheres above atmospheric pressure, catalyst outlet temperature of 650°C, feedstock rate of 25 ml/h and a steam to carbon ratio of 3 : 1. The activity or percentage gasification was 98.0% without carbonaceous deposits.

EXAMPLE 2

500g. of catalyst was suspended in a solution of $Ba(OH)_2$ (467g Ba/liter) for 10 minutes. The catalyst was heated in $CO_2$ as in Example 1 and contained finally 6.43% barium. Activity tests (low pressure) were carried out using hexane and iso-octane at a steam to carbon ratio of 3:1 and feedstock rates of 25.0 and 24.5 ml/h respectively. The activity was 97.8% for the hexane but carbonaceous deposits resulted during the test employing octane as feedstock.

EXAMPLE 3

500g. of catalyst was suspended in a solution of $Ba(OH)_2$ containing 700g/liter barium and dried as in Example 1. The catalyst contained 9.04% barium. Activity tests (low pressure) were carried out using n-hexane and iso-octane at a steam to carbon ratio of 3 : 1 and feedstock rates of 25.0 ml/h. The activities were 98.3% for hexane and 96.6% for iso-octane.

EXAMPLE 4

The catalyst from Example 3 (9.04% Ba) was subjected to an activity test (low pressure) in which the steam to carbon ratio was 2 : 1 for a feedstock of iso-octane at a rate of 24.5 ml/h. The activity was 94.0% with no carbon deposition after 4 hours.

To show the effect of sulphur, 500g. of reduced catalyst was impregnated to 9.0% barium as previously described using commercial barium hydroxide known to contain 0.2% sulphur expressed as the element. An activity of 56.5% was found using hexane as the feedstock and a steam to carbon ratio of 5 : 1. The low activity was caused by the poisoning effect of the sulphur compound in the $Ba(OH)_2$ solution.

It is known from previous experience that at higher pressures, e.g., 32 atmospheres absolute, which are used in commercial steam reforming plants, the problem of breakdown of hydrocarbons to carbonaceous deposits is more serious. To show further the ability of the catalyst to prevent carbonaceous deposits particularly at lower steam moles to carbon gram atom ratios and employing higher molecular weight hydrocarbons, tests in Examples 5 to 7 were done at high pressure e.g., 28 to 35 atmospheres absolute but at lower L.H.S.V., e.g. 3 vol/vol h. Again, because of the nature of the test equipment it was necessary to use crushed material but in these Examples, purely to ensure that the crushed material correctly simulated a catalyst made in accordance with the invention alpha alumina granules in the size range 2.3 mm. were impregnated with a mixed solution of nickel and uranyl nitrates and fired at a temperature of 600°C for 1 hour in air. After four impregnations and calcinations, the catalyst contained 10.8% Ni and 6.4% U expressed as the metals. The nickel oxide and nickel uranate contained in the catalyst was reduced in hydrogen gas at 500°C and impregnated with $Ba(OH)_2$ solution followed by treatment with carbon dioxide at 160°C to convert the $Ba(OH)_2$ to $BaCO_3$. In this way the distribution of $BaCO_3$ throughout the crushed alumina simulated a Raschig ring which would have a concentration of $BaCO_3$ on its outer surface. Thus, the specific steam reforming tests described in Examples 5 to 8 were conducted in a bench scale reactor tube of dimensions 1.9cm internal diameter and 50.8 cm in length. The catalyst bed, consisting of 25 cc. of catalyst granules with a size in the range 2 to 3 mm. was 8.9 cm in length and was situated in the centre of the reactor tube. Along the length of reactor tube and through the catalyst bed was positioned a thermocouple probe for temperature control and temperature measurements. Liquid hydrocarbon and water were separately metered through metering pumps and preheated to 250°C by means of an electric resistance furnace. The hydrocarbon vapour and steam were mixed and passed through a second preheater at 450°C and finally through the catalyst reactor tube heated to give a catalyst outlet temperature of 700°C. The pressure in the apparatus was monitored at the inlet of the first preheater furnace and at the outlet of the apparatus before allowing the pressure of the gas to come to atmospheric pressure through a pressure controller. The product gases and any unreacted hydrocarbon and steam were cooled through a heat exchanger and the liquids collected in a high pressure vessel whilst still at pressure. Samples of uncondensed gas at atmospheric pressure were taken and analysed.

EXAMPLE 5

100cc of reduced nickel/urania catalyst (2.3mm. granules) was impregnated with barium hydroxide solution (230g Ba/1) in an amount sufficient to yield 3.7% barium calculated as the metal. After impregnation, the catalyst was dried in $CO_2$ as previously described. The operating conditions, hydrocarbon feedstocks and results are shown in Table 3. Under the operating conditions of high pressure, no hydrocarbon condensibles were found in the condensed products but carbon laydown resulting in a blockage of the tube occurred using n-hexane at an $H_2O:C$ ratio of 3 : 1 and n-heptane at 4 : 1.

EXAMPLE 6

A catalyst was prepared as in Example 5 containing 4.4% barium calculated as the metal. High pressure activity tests were conducted using n-hexane and n-heptane. The operating conditions are shown in Table 4. No condensed hydrocarbon was found in the condensate and the catalyst was capable of steam reforming n-heptane at a steam to carbon ratio of 2.6:1.

EXAMPLE 7

A catalyst was prepared as in Example 5 containing 5.9% barium. Operating conditions and results of high pressure tests are shown in Table 5. The catalyst was capable of reforming n-heptane, iso-octane and a mixture of n-decane and n-hexane (1:1) at steam to carbon ratios as low as 3:1 without a noticeable pressure increase across the catalyst bed. A further test using a mixture of n-dodecane and n-hexane was operable at a steam to carbon ratio of 4:1.

To demonstrate the effect of the presence of barium in an oxidised catalyst, as distinct from a prereduced catalyst, the catalyst was impregnated with barium hydroxide solution following the procedure set out in Example 8.

EXAMPLE 8

A catalyst consisting of 11% nickel and 7% uranium (expressed as the metals) and with the metals in an oxidised state, was impregnated with barium hydroxide solution sufficient to provide 6% barium in the catalyst. the catalyst was then heated at 160°C in an atmosphere containing $CO_2$ followed by heating in air at 600°C. for two hours. X-ray analysis showed that there was no nickel uranate content, the barium having reacted with the nickel uranate to produce barium uranate.

25 c.cs of catalyst was then subjected to a high pressure test using heptane as the feedstock substantially as has been described in connection with Examples 5 to 7. Whilst no carbon laydown occurred the activity of the catalyst rapidly reduced to 87.5%.

The results of Examples 5 to 8 are shown in the following Tables 3 to 6 respectively.

As will be seen particularly from Tables 3 to 6 the heavier the feedstock requiring reforming the greater is the required amount of barium. As Example 8 illustrates the levels of barium required particularly for heavy feedstocks cannot be incorporated in an oxidised catalyst because of the reaction with the nickel uranate content. It is only with a catalyst prepared in accordance with the invention that such relatively high amounts of alkali or alkaline earth metals can be introduced into the catalyst (for its effect on carbon laydown) without the alkali or alkaline earth metal seriously impairing the activity of the catalyst.

TABLE 3 - EXAMPLE 5

Catalyst:- Pre-reduced Ni/U catalyst containing 3.7% Ba

| Hydrocarbon | $n-C_6H_{14}$ | $n-C_6H_{14}$ | $n-C_6H_{14}$ | $n-C_7H_{16}$ |
|---|---|---|---|---|
| B. Pt (°C) | 69 | 69 | 69 | 98.5 |
| Hydrocarbon feed rate (ml/h) | 78 | 76 | 75 | 75 |
| Steam feed rate (ml/h) | 312 | 247 | 192 | 255 |
| L.H.S.V. ($h^{-1}$) | 3.1 | 3.0 | 3.0 | 3.0 |
| Moles $H_2O$:g-atom of carbon | 4.8 | 3.9 | 3.1 | 4.0 |
| Operating time (h) | 2 | 7 | 0.75 | 2.5 |
| Operating pressure (atmospheres absolute) | 32 | 32 | 32 | 32 |
| Pressure drop due to carbon deposit | −ve | −ve | +ve | +ve |
| Condensed hydrocarbon | Nil | Nil | Nil | Nil |
| Product gas volume (litres/h) | 160 | 165 | — | — |
| G.H.S.V. ($h^{-1}$) | 6,400 | 6,600 | — | — |
| Catalyst inlet temperature (°C) | 540 | 540 | 550 | 540 |

TABLE 3 - EXAMPLE 5-continued

Catalyst:- Pre-reduced Ni/U catalyst containing 3.7% Ba

| | | | | |
|---|---|---|---|---|
| Catalyst outlet temperature (°C) | 700 | 700 | 700 | 700 |

TABLE 4 - EXAMPLE 6

Catalyst :- Pre-reduced Nickel/Urania containing 4.4% Ba

| Hydrocarbon | $n-C_6H_{14}$ | $n-C_6H_{14}$ | $n-C_6H_{14}$ | $n-C_7H_{16}$ |
|---|---|---|---|---|
| B. Pt °C | 69 | 69 | 69 | 98.5 |
| Hydrocarbon feed rate (ml/h) | 76 | 78 | 74 | 82 |
| Water feed rate (ml/h) | 320 | 280 | 200 | 220 |
| L.H.S.V. ($h^{-1}$) | 3.0 | 3.1 | 3.0 | 3.3 |
| Moles $H_2O$: g-atom of C | 5.1 | 4.3 | 3.3 | 2.6 |
| Operating time (h) | 2 | 1 | 4 | 5 |
| Operating pressure (atmospheres absolute) | 32 | 30 | 30 | 32 |
| Pressure increase due to C deposits | −ve | −ve | −ve | −ve |
| Condensed hydrocarbon | Nil | Nil | Nil | Nil |
| Product gas volume (s.l./h) | 167 | — | — | — |
| G.H.S.V. ($h^{-1}$) | 6696 | — | — | — |
| Catalyst inlet temperature (°C) | 550 | 540 | 530 | 550 |
| Catalyst outlet temperature (°C) | 700 | 700 | 700 | 700 |

TABLE 5 - EXAMPLE 7

Catalyst : - Pre-reduced Nickel/Urania containing 5.9% Ba.

| Hydrocarbon | $n-C_7H_{16}$ | $n-C_7H_{16}$ | $n-C_7H_{16}$ | iso-$C_8H_{18}$ | iso-$C_8H_{18}$ |
|---|---|---|---|---|---|
| B. Pt. °C | 98.5 | 98.5 | 98.5 | 99.3 | 99.3 |
| Hydrocarbon feed rate (ml/h) | 75 | 74 | 77 | 80 | 75 |
| Water feed rate (ml/h) | 310 | 260 | 200 | 250 | 195 |
| L.H.S.V. ($h^{-1}$) | 3.0 | 3.0 | 3.1 | 3.2 | 3.0 |
| Moles $H_2O$:g-atom of carbon | 4.8 | 4.1 | 3.0 | 3.6 | 3.0 |
| Operating time (h) | 1 | 5 | 6.5 | 3 | 4.5 |
| Operating pressure (atmospheres absolute) | 32 | 32 | 32 | 32 | 31 |
| Pressure increase due to C deposit | −ve | −ve | −ve | −ve | −ve |
| Condensed hydrocarbon | Nil | Nil | Nil | Nil | Nil |
| Product gas volume (s.l/h) | — | 91 | 100 | 120 | 110 |
| G.H.S.V. ($h^{-1}$) | — | 3640 | 4000 | 4800 | 530 |
| Catalyst inlet temp. °C | 600 | 550 | 540 | 530 | 700 |
| Catalyst outlet temp. °C | 705 | 700 | 700 | 700 | |
| Gas analysis (% by volume) | | | | | |
| $H_2$ | — | — | — | 52.8 | 58.3 |
| $CH_4$ | — | — | — | 19.4 | 17.4 |
| CO | — | — | — | 6.2 | 5.8 |
| $CO_2$ | — | — | — | 20.3 | 18.0 |
| $C_2H_4$ | — | — | — | 0.19 | 0.27 |
| $C_2H_6$ | — | — | — | 1.1 | 0.27 |
| Hydrocarbon (50:50 mixture) | $n-C_{10}H_{22}+n-C_6H_{14}$ | $n-C_{10}H_{22}+n-C_6H_{14}$ | $n-C_{10}H_{22}+n-C_6H_{14}$ | $n-C_{12}H_{26}+n-C_6H_{14}$ | |
| B. Pt. °C (final) | 174 | 174 | 174 | 214.5 | |
| Hydrocarbon feed rate (ml/h) | 77 | 72 | 72 | 69 | |
| Water feed rate (ml/h) | 320 | 255 | 194 | 255 | |
| L.H.S.V. ($h^{-1}$) | 3.1 | 2.9 | 2.9 | 2.8 | |
| Moles $H_2O$:g-atom of carbon | 4.5 | 4.0 | 3.1 | 4.1 | |
| Operating time (h) | 5 | 5 | 5 | 3 | |
| Operating pressure (atmospheres absolute) | 32 | 30 | 28 | 32 | |
| Pressure increase due to carbon deposits | −ve | −ve | −ve | −ve | |
| Condensed hydrocarbon | Nil | Nil | Nil | Nil | |
| Product gas volume (s.l./h) | 91 | 105 | 98 | 94 | |
| G.H.S.V. ($h^{-1}$) | 3640 | 4200 | 3920 | 3760 | |
| Catalyst inlet temp. °C | 530 | 500 | 500 | 520 | |
| Catalyst outlet temp. °C | 710 | 705 | 690 | 710 | |
| Gas analysis (% by vol.) | | | | | |
| $H_2$ | — | 56.4 | 59.5 | 62.7 | |
| $CH_4$ | — | 22.7 | 13.5 | 15.1 | |
| CO | — | 3.6 | 2.4 | 4.1 | |
| $CO_2$ | — | 19.4 | 19.1 | 20.4 | |
| $C_2H_4$ | — | 2.0 | 0.31 | 0.9 | |
| $C_2H_6$ | — | 8.7 | 5.2 | 6.8 | |

TABLE 6 - EXAMPLE 8

Catalyst : - Oxidised Ni/U catalyst containing 6% Ba

| | |
|---|---|
| Hydrocarbon | $n-C_7H_{16}$ |
| B. Pt (°C) | 98.5 |
| Hydrocarbon feed rate (ml/h) | 75 |
| Steam feed rate (ml/h) | 255 |
| L.H.S.V. ($h^{-1}$) | 3.0 |
| Moles $H_2O$:g-atom of carbon | 4.0 |
| Operating time (h) | 4.0 |
| Operating pressure (atmospheres absolute) | 32 |
| Pressure drop due to carbon deposit | −ve |
| Condensed hydrocarbon | 38 mls. |
| Product gas volume (litres/h) | 104 |
| G.H.S.V. ($h^{-1}$) | 3700 |
| Catalyst inlet temperature (°C) | 540 |
| Catalyst outlet temperature (°C) | 700 |

What I claim is:

1. A method of producing a catalyst consisting essentially of impregnating shaped carriers of refractory material with a solution of the salts of a nickel metal constituent and a uranium constituent, the shaped carriers being fired to decompose the salts to form a mixture of the oxide of the nickel constituent and a compound or solid solution of the oxides of the nickel metal and uranium constituents, the nickel component of the catalyst being formed by reduction of the said mixture in a reducing atmosphere to form the nickel metal and uranium constituent in a reduced or unreduced state, the shaped carriers then being impregnated with a water soluble compound of an alkali or alkaline earth metal and finally fixed as the carbonate by heating in an atmosphere containing $CO_2$, said catalyst containing 2 to 60% by weight of the nickel constituent, 5 to 15% by weight of the uranium component, and up to 43% by weight of the alkali or alkaline earth metal, said amounts being expressed as the metal.

2. A method as in claim 1 wherein the impregnated carrier is fired in air to form the said oxides at a temperature in the range of 350° to 900°C.

3. A method as in claim 2 wherein the firing temperature is in the range of 500° to 650°C.

4. A method as in claim 1 wherein the reduction of the nickel metal and uranium constituent is effected at a temperature in the range of 350° to 900°C.

5. A method as in claim 4 wherein said reduction is effected at a temperature in the range of 450° to 550°C.

6. A method as in claim 1 wherein the final heating to fix the alkali or alkaline earth metal as the carbonate is at a temperature within the range ambient to 600°C.

7. A method as in claim 6 wherein said heating is at a temperature within the range of 120° to 200°C.

8. A method as in claim 1 wherein the refractory material of the carrier is alumina.

9. A method of producing a catalyst according to claim 1 consisting essentially of impregnating a shaped carrier of alumina with a solution of nitrates of nickel and uranium and firing the impregnated carrier to form the oxide of nickel and nickel uranate, the active components of the catalyst being formed by reduction of the nickel oxide and nickel uranate in a reducing atmosphere to form nickel metal and tetra-uranium nonoxide, following which the carrier is impregnated with a water soluble compound of alkali or alkaline earth metal and fixed as the carbonate by heating in an atmosphere containing $CO_2$.

10. A method as in claim 9 wherein the water soluble compound of alkali or alkaline earth metal is barium hydroxide.

11. A catalyst formed by the method of claim 1.

12. A catalyst as in claim 11 comprising 2 to 60% by weight nickel, expressed as the metal, 5 to 15% by weight uranium, expressed as the metal and alkali or alkaline earth metals equivalent to 0.5 to 43% by weight of the metal.

13. A catalyst as in claim 12 wherein the alkali or alkaline earth metal is in the range 1.7 to 12% by weight.

* * * * *